(12) United States Patent
Gall

(10) Patent No.: US 6,324,778 B1
(45) Date of Patent: Dec. 4, 2001

(54) FLEXIBLE VEHICLE LICENSE PLATE

(76) Inventor: Robert Gall, 4005 Massachusetts Ave., La Mesa, CA (US) 91941

( * ) Notice: Subject to any disclaimer, the term of this patent is extended or adjusted under 35 U.S.C. 154(b) by 0 days.

(21) Appl. No.: 09/426,948

(22) Filed: Oct. 26, 1999

(51) Int. Cl.⁷ ............................... G09F 7/12; B60R 13/10
(52) U.S. Cl. ................................................ 40/594; 40/200
(58) Field of Search ............................ 40/200, 201, 202, 40/203, 630, 638, 594, 643, 644

(56) References Cited

U.S. PATENT DOCUMENTS

| | | | |
|---|---|---|---|
| 1,073,004 | | 9/1913 | Wakeman ............................ 40/200 |
| 1,660,575 | * | 2/1928 | Overton ............................... 40/630 |
| 1,833,742 | * | 11/1931 | Gallogly .............................. 40/630 |
| 1,864,641 | * | 6/1932 | Davis ................................... 40/630 |
| 1,946,946 | * | 2/1934 | Phinney ............................... 40/630 |
| 2,023,099 | * | 12/1935 | Reiter et al. ........................ 40/630 |
| 2,258,754 | | 10/1941 | Gill ...................................... 116/32 |
| 2,369,549 | * | 2/1945 | Francescon ......................... 40/630 |
| 2,400,079 | | 3/1946 | Ducey .................................. 40/135 |
| 2,603,899 | * | 7/1952 | Leander ............................... 40/630 |
| 2,815,598 | * | 12/1957 | Gazan .................................. 40/630 |
| 3,252,234 | * | 5/1966 | Goodman ............................ 40/630 |
| 3,799,829 | * | 3/1974 | Heatwole ............................ 40/630 |
| 3,864,855 | * | 2/1975 | Pekko et al. ........................ 40/2 R |
| 3,868,293 | * | 2/1975 | Selph ................................... 161/39 |
| 5,141,792 | * | 8/1992 | Kurtin .................................. 428/41 |
| 5,149,571 | | 9/1992 | Croell .................................. 40/428 |
| 5,471,773 | * | 12/1995 | Hoffman .............................. 40/544 |
| 5,518,787 | * | 5/1996 | Konkol ................................ 428/43 |
| 5,601,313 | * | 2/1997 | Konkol et al. ...................... 283/81 |
| 5,704,652 | | 1/1998 | Curiel .................................. 283/94 |
| 5,783,265 | * | 7/1998 | Parkander ............................ 428/13 |
| 5,815,965 | | 10/1998 | de Greeve ........................... 40/209 |
| 5,860,238 | * | 1/1999 | Anderson ............................ 40/630 |
| 5,913,543 | * | 6/1999 | Curiel .................................. 283/94 |
| 6,113,271 | * | 9/2000 | Scott et al. ......................... 383/211 |
| 6,129,975 | * | 10/2000 | Curiel .................................. 428/195 |

\* cited by examiner

Primary Examiner—Lynne H. Browne
Assistant Examiner—Kenn Thompson
(74) Attorney, Agent, or Firm—Freling E. Baker; Baker & Eddy

(57) ABSTRACT

A flexible plastic license plate-like panel for bonding to a motor vehicle with a pressure sensitive adhesive. The panel has a main, approximately rectangular, area on which the conventional license numbers and letters are printed, with an area above or below that area for purchaser personalized information provided. The panel has a central extension extending beyond the top of the approximately rectangular area for stickers showing information such as state identification, or month, year of expiration, etc. One of the front and back surfaces of the panel is coated with a pressure sensitive adhesive. Where the adhesive is on the back, the panel will be bonded to the vehicle bumper or other exterior part. Where the adhesive is on the front, the panel will be bonded to the inside surface of a window, to be visible from outside the vehicle. A security strip may be formed by using a strip having a different tack across the adhesive coated surface. Also, a central non-tacky area can be provided in the adhesive coated surface to aid in mounting the panel on a structure.

17 Claims, 1 Drawing Sheet

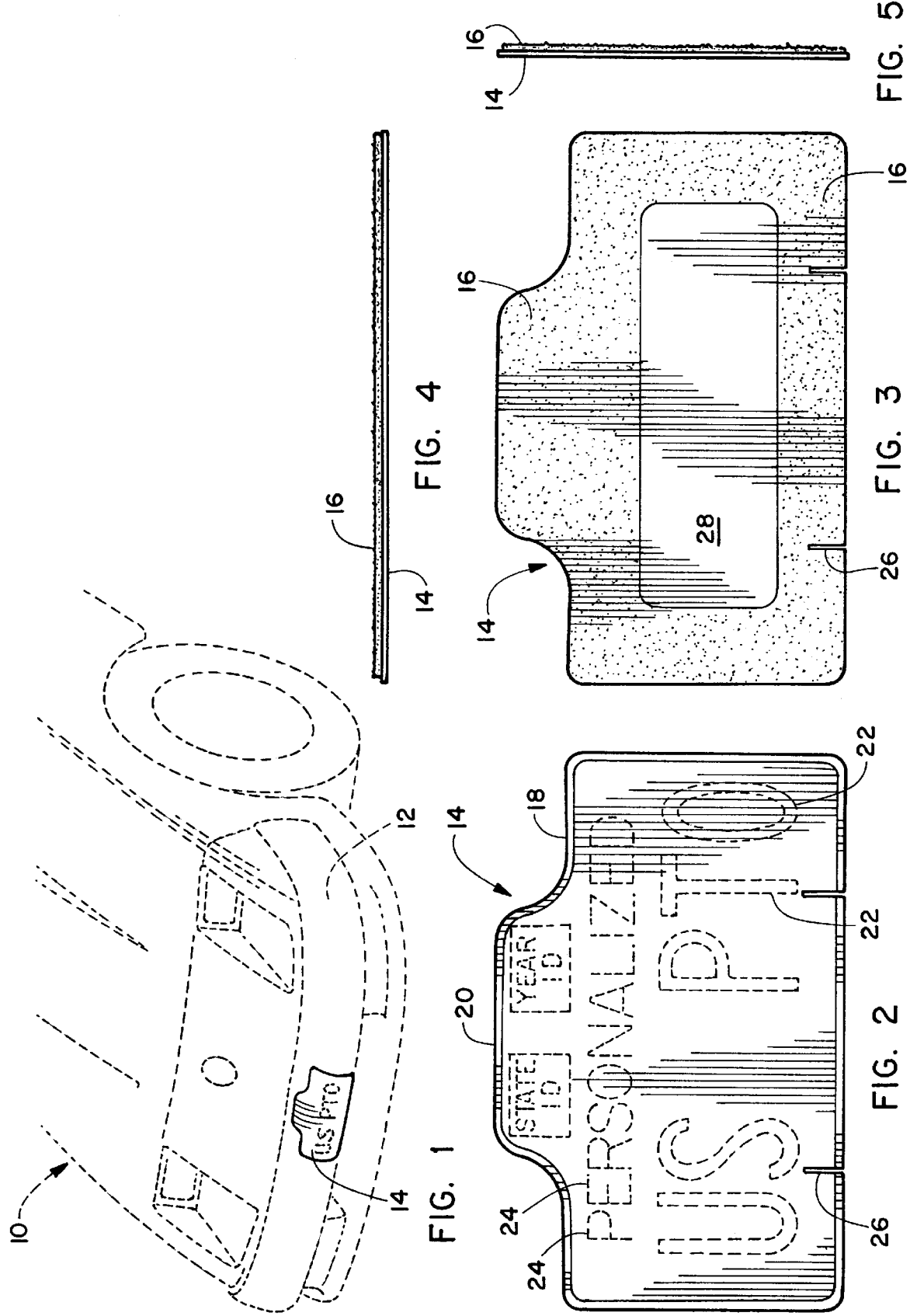

FLEXIBLE VEHICLE LICENSE PLATE

FIELD OF THE INVENTION

This invention relates to license plates of the sort affixed to the back, and often also to the front, of motor vehicles such as automobiles, trucks and motorcycles.

BACKGROUND OF THE INVENTION

In the United States, all states require motor vehicle owners to purchase a standard sized, metal, license plate bearing alphanumeric indicia to be fastened to a mounting bracket at the rear of the vehicle. Many states also require a front license plate. Most other countries require that some sort of alphanumeric license plate be mounted on all motor vehicles. In some countries, the vehicle owner does not receive the plate from the governmental agency but must provide the plate by fastening numbers and/or letters to a panel and fasten the panel to the vehicle.

Many vehicles, particularly those of foreign manufacture, do not include a bracket to support a front license plate. In order to mount a required front plate on those vehicles, it is necessary to drill holes in the rounded bumper to mount a generally unsightly bracket. Many people do not mount the required plate, or a personalized plate where allowed, because of the absence of a reasonably attractive mounting bracket.

Many states have accommodated the desire to personalize vehicles by providing personalized or so-called "vanity" plates at considerably higher cost. However, these plates only provide six or seven selected letters or numbers to be used, severely limiting the degree of personalization. There is no convenient way, other than a license plate frame, to add slogans or the like supporting a particular athletic team (e.g. "Go Big Red"), a religious slogan, a city or neighborhood slogan or the like.

License plates are often stolen. Thieves will take plates having unexpired annual stickers to replace their own expired plates or to use on a stolen car to be used in a robbery or the like. Present metal plates fastened by bolts to a mounting bracket can be removed quickly and easily.

The metal plates presently being used are also subject to physical damage from impact with curbs, restraining posts or the like. Since the plates are relatively expensive to manufacture, they tend to be used for quite a number of years, with an annual sticker being attached to show payment of the annual fee. Over the years, the plates will rust, particularly in snow country where the roads are salted in winter, and fade, so that the plates become very unattractive and indica is not easily read.

Ducey in U.S. Pat. No. 2,400,079 describes a multi-layer license plate having a paper sheet bearing registration indicia, an overlying sheet having a cut-out area in alphanumeric shapes over the indicia and a transparent sheath containing the paper and overlying sheet. This license is rigid and complex and does not overcome the above-noted problems.

Another multi-layer license plate is disclosed by Croell in U.S. Pat. No. 5,149,571. Here, a temporary registration paper is bonded to a transparent sheet to protect the paper from the weather. This arrangement is not suitable for permanent license plates.

A holder for portable dealer license plates is described by de Greeve in U.S. Pat. No. 5,815,965. A pocket receives the dealer plate and an advertising strip is provided on the holder adjacent to the plate. A strap is connected to the plate holder for carrying the holder. This plate holder is not suitable for plates permanently fastened to a vehicle.

Thus, there is a continuing need for improved license plates and license plate replacement panels that are attractive, may be attached to vehicles without requiring a mounting bracket, that can be easily personalized over the entire plate or adjacent to any required alphanumeric indicia, that resist theft, rust and impact damage and that are inexpensive and easily replaceable.

SUMMARY OF THE INVENTION

The above-noted problems are overcome in accordance with this invention by a plate or panel formed from a flexible plastic material, the panel having an approximately rectangular portion with a central extension extending from one of the longer sides of the rectangle. Predetermined alphanumeric information corresponding to that provided on conventional metal plates is provided on the front of the approximately rectangular portion. Information relating to state identification and year of registration may be applied to the extension, which may be in the form of a colored, printed, sticker. A hologram may be added for security. Typically, the extension may carry stickers showing the month and year of registration expiration. While the panel may replace a conventional metal permanent license plate, it may also be used in place of a temporary plate, a dealer plate, a parking permit plate or any similar indicia-bearing plate.

Between the alphanumeric information and the extension is proved a space across the rectangle for the purchaser to provide state imprinted personalized information. While this space is preferably above the alphanumeric license information, it could be below. This may, for example, be a slogan or picture relating to an athletic team, a college, a church or other information showing hobbies, such as fishing, hunting, golf, tennis, etc.

One of the front and back surfaces of the panel is coated with a pressure sensitive adhesive, covered by a removable protective cover sheet. Where the adhesive is on the back surface, the cover sheet may be removed and the panel quickly bonded to a front or back vehicle bumper or a vehicle body or exterior window portion. Where the adhesive is on the front, imaged, surface, the cover sheet may be removed and the panel bonded to the interior surface of a window, to be visible from outside the vehicle. Alternatively, a reverse cut of the indicia on back surface adhesive may be bonded to a window interior surface. The surface of the panel bearing indicia is preferably formed from a highly reflective material, such as the Scotchlite® material available from the 3M Corporation. This panel does not require that any mounting frame or bracket be fastened to the vehicle for mounting the license plate panel.

Any suitable flexible, reflective, exposure resistant, plastic may be used for the panel. For best results, a polyvinyl material having a thickness of from about 2 to 4 mil is preferred. The panel can be any selected base color, with the indicia thereon of any contrasting color.

To aid in applying the panel to a bumper or the like, a central adhesive free area may be provided in the adhesive coated side. Also, short slits may be provided in any desired side of the panel to aid in conforming the panel to a convex surface.

It is, therefor, an object of this invention to provide a license plate type panel of ideal shape for presenting alphanumeric license indicia, space for state identification and registration information and a second space for personalized information.

Another object is to provide a flexible license plate type panel with an adhesive coating and a highly reflective outer surface for easy mounting on vehicle bumpers, body or windows as desired.

A further object is to provide a panel that is mounted on a vehicle without requiring any mounting bracket or frame fastened to the vehicle.

Yet another object is to provide a panel that can carry personalized information both in the alphanumeric license indicia and in the space between the alphanumeric license indicia and the registration informational.

Still a further object is to provide a panel that is bonded to a vehicle in a manner highly resistant to theft of the panel.

BRIEF DESCRIPTION OF THE DRAWING

Details of the invention, and of preferred embodiments thereof, will be further understood upon reference to the drawing, wherein:

FIG. 1 is a perspective frontal view of an automobile with the license plate type panel adhered to the front bumper;

FIG. 2 is a front elevation view of the license plate type panel of this invention;

FIG. 3 is a back elevation view of the panel;

FIG. 4 is a top plan or edge view of the panel; and

FIG. 5 is a side elevation or edge view of the panel.

DETAILED DESCRIPTION OF PREFERRED EMBODIMENTS

Referring to FIG. 1, there is seen, in broken lines, an automobile 10 having a front bumper 12. The flexible license plate-like panel 14 of this invention is affixed to bumper 12. Panel 14 is formed from thin, flexible, plastic material that easily conforms to convex bumper 12 and is bonded thereto by a pressure sensitive adhesive layer 16 as best seen in FIGS. 3–5. While any suitable plastic material may be used for panel 14, a polyvinyl material such as Scotchcal® material from the 3M company is preferred. Any suitable pressure sensitive adhesive 16 may be used on panel 14, covered until use by a removable cover sheet. The adhesive may be of the type that hardens or polymerizes when exposed to the sun's heat while on the automobile and over time, to make theft more difficult. The outer surface of panel 14 is preferably formed from highly reflective material, such as Scotchlite® material from 3M. The panel material is preferably such that an attempt to peel the panel off of a surface will result in shredding the panel, making it unusable by a thief.

As seen in FIG. 2, panel 14 has a relatively large approximately rectangular areas 18 and a central extension 20 extending outwardly from one long edge of the rectangular area. While a rectangular area is preferred for ease in applying the common six or seven digits of license information, other shapes may be used, if desired, with any shape capable of providing the several areas described herein to be considered "approximately rectangular" . As seen in FIGS. 1 and 2, Alphanumeric information (here, letters 22) showing the vehicle license information is placed across the lower portion of rectangular area 18. This could be the serial number and letter combination provided by the appropriate Department of Motor Vehicles or equivalent agency, or could be personalized letters and/or number as selected by the purchaser, generally at extra cost. Along extension 20, space is provided for conventional stickers showing state identification, a month, or a year of expiration, as required by the license issuing agency. Between the required alphanumeric license information and extension 20, the purchaser has a space 24 (as indicated as "personalized") for adding personalized information (with or without the personalized alphanumeric license information). Typically, this information could be imprinted by the licensing agency or could be applied by the purchaser in the form of a printed elongated sticker.

The flexible material has a degree of stretch allowing it to conform to a convex shape. If desired, short slits 26 may be provided at appropriate locations along the panel periphery to aid in conforming the panel to a mounting location having a curved shape.

In the embodiment shown, the back surface of panel 14 can be coated with the adhesive for placement on the exterior of a vehicle. In another variation, a panel with back surface adhesive can be reverse cut for application to a window interior surface. Alternatively, if desired, a transparent pressure sensitive adhesive could be coated on the panel surface bearing the various indicia. The adhesive would appear as in FIGS. 4 and 5, but on the opposite side. Then the panel could be adhered to the inner surface of a vehicle window, to be easily viewed from outside the vehicle, A security strip can be provided by providing a stripe of material having different tack across a portion of the panel, such as area 28. Then, when someone tries to peal the panel from a surface, the panel will tend to split along the boundary of two areas with different tack, making the panel unusable by a thief. Alternately, area 28 could be tack free, such as by not applying adhesive there or by placing a piece of paper over the area. This makes application of the panel to a bumper or the like easier, since the edges may be slightly lifted and realigned easily without having to lift a major portion of the panel.

While certain specific relationships, materials and other parameters have been detailed in the above description of preferred embodiments, those can be varied, where suitable, with similar results. Other applications, variation and ramifications of the present invention will occur to those skilled in the art upon reading the present disclosure. Those are intended to be included within the scope of this invention as defined in the appended claims.

I claim:

1. A vehicle mountable flexible license plate which comprises:

a panel formed from a flexible plastic material to enable mounting on a curved surface;

said panel having front and back surfaces and having a main area with an approximately rectangular configuration with two opposite longer sides and two opposite narrower ends;

a central extension extending from one longer sides along from about 40 to 60 percent of said longer side;

predetermined alphanumeric indicia on said front surface of said main area;

personalization space adjacent to said predetermined alpha numeric indicia for personalized information;

said central extension defining predetermined indicia representing space for at least one sticker to be secured to said front surface of said central extension for indicating payment of predetermined governmental fees;

one of said front and back surfaces coated with a pressure sensitive adhesive; and a release sheet over said pressure sensitive adhesive.

2. The panel according to claim 1 wherein said pressure sensitive adhesive is coated on said back surface so that said panel may be bonded to a vehicle bumper or other end surface.

3. The panel according to claim 1 wherein said adhesive is coated on said back surface and indicia are reverse cut so that said panel may be bonded to a vehicle window inside surface.

4. The panel according to claim 1 wherein said pressure sensitive adhesive is coated on said front surface so that said panel may be bonded to a vehicle window inside surface.

5. The panel according to claim 1 wherein said flexible plastic material is a polyvinyl material having a thickness of from about 2 to 4 mil.

6. The panel according to claim 1 wherein said pressure sensitive adhesive is a polyvinyl adhesive and includes a security strip across the adhesive coated surface having a different tack than the remainder of the surface.

7. The panel according to claim 1 wherein a non-tacky material is bonded to a central area of said adhesive coating to provide a non-tacky area to assist in mounting said panel on a surface.

8. The panel according to claim 1 wherein said predetermined alphanumeric indicia represents governmental serialization.

9. A vehicle mountable license plate which comprises:

a panel formed from a flexible polyvinyl material adapted for mounting on a curved surface;

said panel having front and back surfaces and having a main area with an approximately rectangular configuration with two opposite longer sides and two opposite narrower ends;

a central extension extending from one longer sides along from about 40 to 60 percent of said longer side;

predetermined alphanumeric indicia on said front surface of said main area;

personalization space extending lengthwise of said plate between said extension and said predetermined alpha numeric indicia for personalized information;

said central extension defining predetermined indicia representing space for at least one sticker to be secured to said front surface of said central extension for indicating payment of predetermined governmental fees;

one of said front and back surfaces at least partially coated with a pressure sensitive adhesive; and a release sheet over said pressure sensitive adhesive.

10. A vehicle mountable panel which comprises:

a panel formed from a flexible, reflective, polyvinyl material;

said panel having front and back surfaces and having a main area with an approximately rectangular configuration with two opposite longer sides and two opposite narrower ends and front and back surfaces;

a central extension extending from one longer sides along from about 40 to 60 per cent of said longer side;

predetermined alphanumeric indicia on said front surface of said main area;

personalization space extending lengthwise of said plate between said extension and said predetermined alpha numeric indicia for personalized information;

predetermined indicia representing space for at least one sticker to be secured to said front surface of said central extension for indicating payment of predetermined governmental fees;

one of said front and back surfaces at least partially coated with a pressure sensitive adhesive; and a release sheet over said pressure sensitive adhesive.

11. The panel according to claim 10 wherein said pressure sensitive adhesive is coated on said back surface so that said panel may be bonded to a vehicle bumper or other end surface.

12. The panel according to claim 10 wherein said adhesive is coated on said back surface and indicia are reverse cut so that said panel may be bonded to a vehicle window inside surface.

13. The panel according to claim 10 wherein said pressure sensitive adhesive is coated on said front surface so that said panel may be bonded to the inside of a vehicle window.

14. The panel according to claim 10 wherein said flexible plastic material has a thickness of from about 2 to 4 mil.

15. The panel according to claim 10 wherein said pressure sensitive adhesive is a polyvinyl adhesive and includes a security strip across the adhesive coated surface having a different tack than the remainder of the surface.

16. The panel according to claim 10 wherein said predetermined alphanumeric indicia represents governmental serialization.

17. The panel according to claim 10 wherein a non-tacky material is bonded to a central area of said adhesive coating to provide a non-tacky area to assist in mounting said panel on a surface.

* * * * *